(12) United States Patent
Pan et al.

(10) Patent No.: US 11,765,774 B2
(45) Date of Patent: Sep. 19, 2023

(54) PHYSICAL RANDOM ACCESS FOR NR-U

(71) Applicant: INTERDIGITAL PATENT HOLDINGS, INC., Wilmington, DE (US)

(72) Inventors: Kyle Jung-Lin Pan, Saint James, NY (US); Fengjun Xi, San Diego, CA (US); HaoHao Qin, San Diego, CA (US)

(73) Assignee: InterDigital Patent Holdings, Inc., Wilmington, DE (US)

( * ) Notice: Subject to any disclaimer, the term of this patent is extended or adjusted under 35 U.S.C. 154(b) by 354 days.

(21) Appl. No.: 16/963,002

(22) PCT Filed: Jan. 18, 2019

(86) PCT No.: PCT/US2019/014135
§ 371 (c)(1),
(2) Date: Jul. 17, 2020

(87) PCT Pub. No.: WO2019/143897
PCT Pub. Date: Jul. 25, 2019

(65) Prior Publication Data
US 2020/0359426 A1 Nov. 12, 2020

Related U.S. Application Data

(60) Provisional application No. 62/619,621, filed on Jan. 19, 2018.

(51) Int. Cl.
*H04W 4/00* (2018.01)
*H04W 74/08* (2009.01)
(Continued)

(52) U.S. Cl.
CPC ....... *H04W 74/0833* (2013.01); *H04W 16/14* (2013.01); *H04W 52/36* (2013.01); *H04W 74/0808* (2013.01)

(58) Field of Classification Search
CPC . H04W 74/0833; H04W 16/14; H04W 52/36; H04W 74/0808
See application file for complete search history.

(56) References Cited

U.S. PATENT DOCUMENTS 9,603,048 B2 3/2017 Pelletier et al.
10,171,276 B2 1/2019 Stern-Berkowitz et al.
(Continued)

FOREIGN PATENT DOCUMENTS

WO WO-2018215075 A1 * 11/2018 ............ H04W 16/14

OTHER PUBLICATIONS

Huawei et al., "NR licensed assisted and standalone operation on unlicensed bands," 3GPP TSG RAN WG1 Adhoc Meeting, R1-1800042, Vancouver, Canada (Jan. 22-26, 2018).
(Continued)

*Primary Examiner* — Siren Wei
(74) *Attorney, Agent, or Firm* — Volpe Koenig

(57) ABSTRACT

Systems and methods are disclosed for performing random access (RA) in 5G New Radio (NR) systems, including New Radio in unlicensed spectrum (NR-U) systems. A wireless transmit/receive unit (WTRU) may receive a configuration for physical random access channel (PRACH) resources. The WTRU may determine whether to use a first type of PRACH transmission or a second type of PRACH transmission. For the first type of PRACH transmission, the WTRU may select a PRACH resource, without performing listen-before-talk (LBT), immediately following reception of an synchronization signal block (SSB). For the second type of PRACH transmission, the WTRU may randomly select the PRACH resource associated with the SSB, and perform a first LBT on the selected PRACH resource. The WTRU may transmit a PRACH preamble in the selected PRACH resource. The WTRU may perform a second LBT for
(Continued)

random access response (RAR) reception for hidden node detection.

19 Claims, 10 Drawing Sheets

(51) Int. Cl.
*H04W 16/14* (2009.01)
*H04W 52/36* (2009.01)

(56) References Cited

U.S. PATENT DOCUMENTS

| | | | |
|---|---|---|---|
| 10,420,135 | B2 | 9/2019 | Yang et al. |
| 10,548,167 | B2 | 1/2020 | Ahn et al. |
| 11,026,269 | B2 | 6/2021 | Li et al. |
| 11,083,020 | B2 | 8/2021 | Pelletier et al. |
| 2017/0150523 | A1* | 5/2017 | Patel .................. H04W 74/008 |
| 2017/0231006 | A1 | 8/2017 | Yin et al. |
| 2017/0231011 | A1 | 8/2017 | Park et al. |
| 2017/0238334 | A1* | 8/2017 | Yang ................ H04W 74/0808 370/336 |
| 2017/0273108 | A1 | 9/2017 | Damnjanovic et al. |
| 2017/0339693 | A1* | 11/2017 | Cierny .................. H04W 24/10 |
| 2019/0254077 | A1* | 8/2019 | Sahlin .................. H04L 5/0092 |

OTHER PUBLICATIONS

IEEE Standard for Information technology—Telecommunications and information exchange between systems—Local and metropolitan area networks—Specific requirements; Part 11: Wireless LAN Medium Access Control (MAC) and Physical Layer (PHY) Specifications, IEEE Std. 802.11-2016 (Dec. 7, 2016).
IEEE Standard for Information technology—Telecommunications and information exchange between systems—Local and metropolitan area networks—Specific requirements; Part 11: Wireless LAN Medium Access Control (MAC) and Physical Layer (PHY) Specifications; Amendment 4: Enhancements for Very High Throughput for Operation in Bands below 6GHz, IEEE Std 802.11ac-2013 (Dec. 11, 2013).
IEEE Standard for Information Technology—Telecommunications and information exchange between systems—Local and metropolitan area networks—Specific requirements; Part 11: Wireless LAN Medium Access Control (MAC) and Physical Layer (PHY) specifications; Amendment 5: Television White Spaces (TVWS) Operation, IEEE 802.11af-2013 (Dec. 11, 2013).
IEEE Standard for Information technology—Telecommunications and information exchange between systems—Local and metropolitan area networks—Specific requirements; Part 11: Wireless LAN Medium Access Control (MAC) and Physical Layer (PHY) Specifications; Amendment 5: Enhancements for Higher Throughput, IEEE Std 802.11n-2009 (Sep. 2009).
IEEE Standard for Information technology—Telecommunications and information exchange between systems Local and metropolitan area networks—Specific requirements; Part 11: Wireless LAN Medium Access Control (MAC) and Physical Layer (PHY) Specifications; Amendment 2: Sub 1 GHz License Exempt Operation, IEEE 802.11ah-2016 (Dec. 7, 2016).
Interdigital Inc., "Considerations on Random Access for NR Unlicensed Spectrum," 3GPP TSG RAN WG1 Meeting 92, R1-1802648, Athens, Greece (Feb. 26-Mar. 2, 2018).
Interdigital Inc., "On Initial Access and Mobility for NR," 3GPP TSG RAN WG1 Meeting #94, R1-1809090, Gothenburg, Sweden (Aug. 20-24, 2018).
Interdigital Inc., "On Initial Access for NR Unlicensed Spectrum," 3GPP TSG RAN WG1 Meeting #93, R1-1807037, Busan, South Korea (May 21-25, 2018).
Interdigital Inc., "On Random Access for NR Unlicensed Spectrum," 3GPP TSG RAN WG1 Meeting #92bis, R1-1804887, Sanya, China (Apr. 16-20, 2018).
Interdigital, Inc., "Initial Access and Mobility Procedures in NR-U," 3GPP TSG RAN WG1 Ad-hoc Meeting 1901, R1-1900787, Taipei, Taiwan (Jan. 21-25, 2019).
International Telecommunication Union, "IMT Vision—Framework and overall objectives of the future development of IMT for 2020 and beyond; M Series Mobile, radio determination, amateur and related satellite services," Recommendation ITU-R M.2083-0 (Sep. 2015).
Alcatel-Lucent Shanghai Bell et al., "UL LBT and DL/UL Frame Structure for LAA," 3GPP TSG RAN WG1 Meeting #82, R1-154574, Beijing, China (Aug. 25-28, 2015).
Huawei et al., "On PRACH resource indication and level determination during random access," 3GPP TSG RAN WG1 Meeting #83, R1-156446, Anaheim, USA (Nov. 15-22, 2015).
Interdigital Communications, "MAC Layer Impact of Supporting Different Services," 3GPP TSG-RAN WG2 #96, R2-168468, Reno, Nevada (Nov. 14-18, 2016).

* cited by examiner

PHYSICAL RANDOM ACCESS FOR NR-U

CROSS REFERENCE TO RELATED APPLICATIONS

This application is the U.S. National Stage, under 35 U.S.C. § 371, of International Application No. PCT/US2019/014135 filed Jan. 18, 2019, which claims the benefit of U.S. Provisional Application No. 62/619,621, filed Jan. 19, 2018, the content of which are hereby incorporated by reference herein.

BACKGROUND

Recent Third Generation Partnership Project (3GPP) standards discussions define several deployment scenarios such as indoor hotspot, dense urban, rural, urban macro, and high speed. Based on general requirements set out by International Telecommunication Union Radio communication Sector (ITU-R), Next Generation Mobile Networks (NGMN) and 3GPP, a broad classification of the use cases for emerging Fifth Generation (5G) New Radio (NR) systems may be classified as enhanced mobile broadband (eMBB), massive machine type communications (mMTC) and ultra-reliable and low latency communications (URLLC). These use cases focus on meeting different performance requirements such as higher data rate, higher spectrum efficiency, low power and higher energy efficiency, and/or lower latency and higher reliability. Moreover, a wide range of spectrum bands ranging from 700 MHz to 80 GHz are being considered for a variety of deployment scenarios.

In wireless communications, as the carrier frequency increases, severe path loss may become a crucial limitation to guarantee sufficient coverage. Transmission in millimeter wave (mmW) systems may additionally suffer from non-line-of-sight losses, such as diffraction loss, penetration loss, oxygen absorption loss, and/or foliage loss. During initial access, a base station and WTRU may need to overcome these high path losses and discover each other. Utilizing dozens or even hundreds of antenna elements to generate beamformed signals is an effective way to compensate for severe path loss by providing significant beamforming gain. Beamforming techniques may include digital, analogue and hybrid beamforming.

SUMMARY

Systems and methods are disclosed for performing random access (RA) in 5G New Radio (NR) systems, including New Radio in unlicensed spectrum (NR-U) systems. A wireless transmit/receive unit (WTRU) may receive a configuration for physical random access channel (PRACH) resources. The WTRU may determine whether to use a first type of PRACH transmission or a second type of PRACH transmission. If the first type of PRACH transmission is used, the WTRU may select a PRACH resource, without performing listen-before-talk (LBT), immediately following reception of an synchronization signal block (SSB). If the second type of PRACH transmission is used, the WTRU may randomly select the PRACH resource associated with the SSB, and perform a first LBT on the selected PRACH resource. The WTRU may transmit a PRACH preamble in the selected PRACH resource. The WTRU may perform a second LBT for random access response (RAR) reception for hidden node detection. If the RAR is not received successfully, the WTRU may retransmit the PRACH preamble, without power ramping if a hidden node is detected, and with power ramping if a hidden node is not detected.

BRIEF DESCRIPTION OF THE DRAWINGS

A more detailed understanding may be had from the following description, given by way of example in conjunction with the accompanying drawings, wherein like reference numerals in the figures indicate like elements, and wherein.

DETAILED DESCRIPTION

Figure 1A:
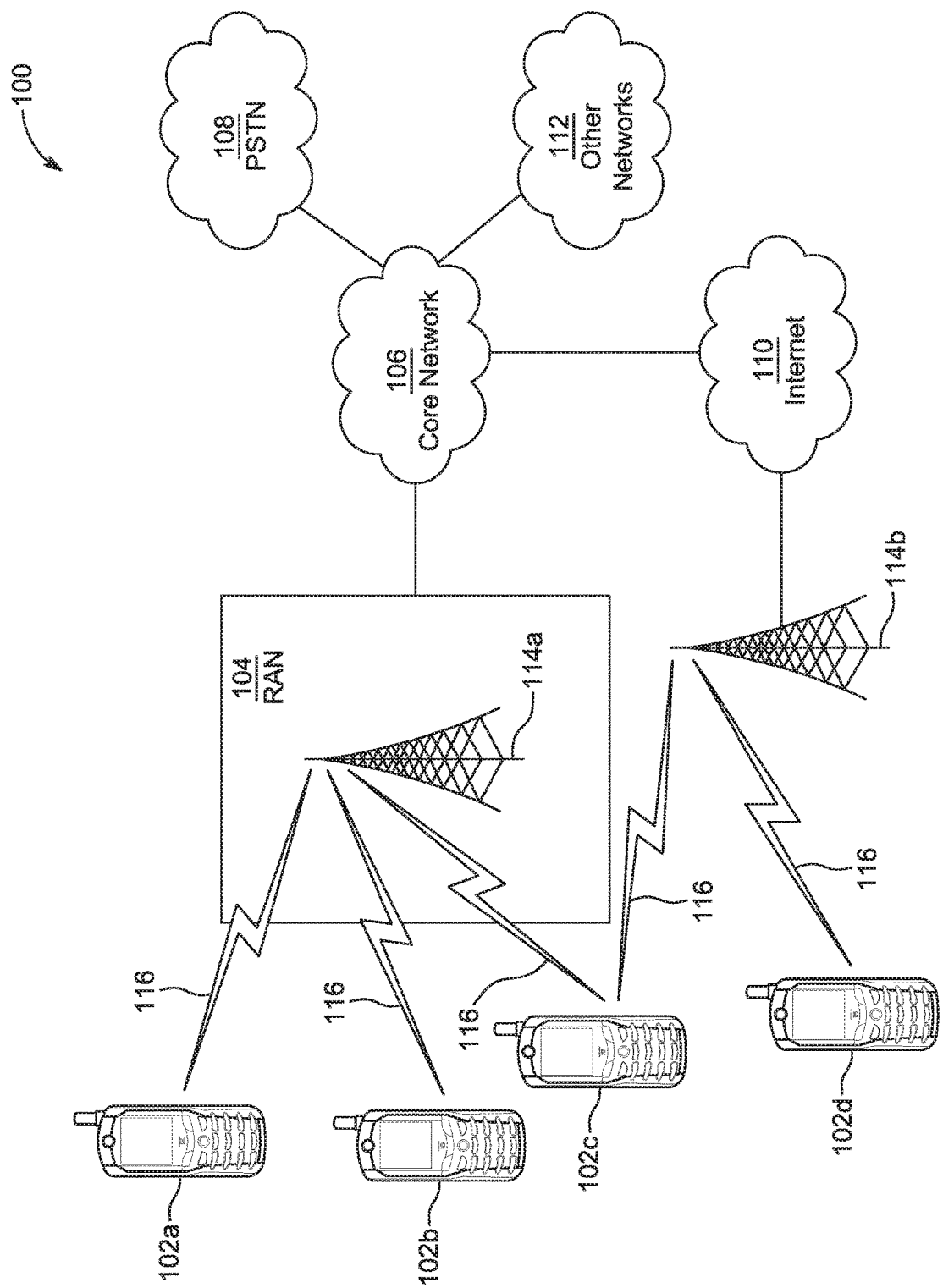
FIG. 1A is a system diagram illustrating an example communications system in which one or more disclosed embodiments may be implemented.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word DFT-Spread OFDM (ZT UW DTS-s OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102a, 102*b*, 102*c*, 102*d*, a RAN 104/113, a CN 106/115, a public switched telephone network (PSTN) 108, the Internet 110, and other networks 112, though it will be appreciated that the disclosed embodiments contemplate any number of WTRUs, base stations, networks, and/or network elements. Each of the WTRUs 102*a*, 102*b*, 102*c*, 102*d* may be any type of device configured to operate and/or communicate in a wireless environment. By way of example, the WTRUs 102*a*, 102*b*, 102*c*, 102*d*, any of which may be referred to as a "station" and/or a "STA", may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102*a*, 102*b*, 102*c* and 102*d* may be interchangeably referred to as a UE.

The communications systems 100 may also include a base station 114*a* and/or a base station 114*b*. Each of the base stations 114*a*, 114*b* may be any type of device configured to wirelessly interface with at least one of the WTRUs 102*a*, 102*b*, 102*c*, 102*d* to facilitate access to one or more communication networks, such as the CN 106/115, the Internet 110, and/or the other networks 112. By way of example, the base stations 114*a*, 114*b* may be a base transceiver station (BTS), a Node-B, an eNode B, a Home Node B, a Home eNode B, a gNB, a NR NodeB, a site controller, an access point (AP), a wireless router, and the like. While the base stations 114*a*, 114*b* are each depicted as a single element, it will be appreciated that the base stations 114*a*, 114*b* may include any number of interconnected base stations and/or network elements.

The base station 114*a* may be part of the RAN 104/113, which may also include other base stations and/or network elements (not shown), such as a base station controller (BSC), a radio network controller (RNC), relay nodes, etc. The base station 114*a* and/or the base station 114*b* may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114*a* may be divided into three sectors. Thus, in one embodiment, the base station 114*a* may include three transceivers, i.e., one for each sector of the cell. In an embodiment, the base station 114*a* may employ multiple-input multiple output (MIMO) technology and may utilize multiple transceivers for each sector of the cell. For example, beamforming may be used to transmit and/or receive signals in desired spatial directions.

The base stations 114*a*, 114*b* may communicate with one or more of the WTRUs 102*a*, 102*b*, 102*c*, 102*d* over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114*a* in the RAN 104/113 and the WTRUs 102*a*, 102*b*, 102*c* may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed UL Packet Access (HSUPA).

In an embodiment, the base station 114*a* and the WTRUs 102*a*, 102*b*, 102*c* may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114*a* and the WTRUs 102*a*, 102*b*, 102*c* may implement a radio technology such as NR Radio Access, which may establish the air interface 116 using New Radio (NR).

In an embodiment, the base station 114*a* and the WTRUs 102*a*, 102*b*, 102*c* may implement multiple radio access technologies. For example, the base station 114*a* and the WTRUs 102*a*, 102*b*, 102*c* may implement LTE radio access and NR radio access together, for instance using dual connectivity (DC) principles. Thus, the air interface utilized by WTRUs 102*a*, 102*b*, 102*c* may be characterized by multiple types of radio access technologies and/or transmissions sent to/from multiple types of base stations (e.g., a eNode B and a gNB).

In other embodiments, the base station 114*a* and the WTRUs 102*a*, 102*b*, 102*c* may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1×, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114*b* in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114*b* and the WTRUs 102*c*, 102*d* may implement a radio technology such as IEEE 802.11 to establish a wireless local area network (WLAN). In an embodiment, the base station 114*b* and the WTRUs 102*c*, 102*d* may implement a radio technology such as IEEE 802.15 to establish a wireless personal area network (WPAN). In yet another embodiment, the base station 114*b* and the WTRUs 102*c*, 102*d* may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114*b* may have a direct connection to the Internet 110. Thus, the base station 114*b* may not be required to access the Internet 110 via the CN 106/115.

The RAN 104/113 may be in communication with the CN 106/115, which may be any type of network configured to provide voice, data, applications, and/or voice over internet protocol (VoIP) services to one or more of the WTRUs 102a, 102b, 102c, 102d. The data may have varying quality of service (QoS) requirements, such as differing throughput requirements, latency requirements, error tolerance requirements, reliability requirements, data throughput requirements, mobility requirements, and the like. The CN 106/115 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104/113 and/or the CN 106/115 may be in direct or indirect communication with other RANs that employ the same RAT as the RAN 104/113 or a different RAT. For example, in addition to being connected to the RAN 104/113, which may be utilizing a NR radio technology, the CN 106/115 may also be in communication with another RAN (not shown) employing a GSM, UMTS, CDMA 2000, WiMAX, E-UTRA, or WiFi radio technology.

The CN 106/115 may also serve as a gateway for the WTRUs 102a, 102b, 102c, 102d to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104/113 or a different RAT.

Some or all of the WTRUs 102a, 102b, 102c, 102d in the communications system 100 may include multi-mode capabilities (e.g., the WTRUs 102a, 102b, 102c, 102d may include multiple transceivers for communicating with different wireless networks over different wireless links). For example, the WTRU 102c shown in FIG. 1A may be configured to communicate with the base station 114a, which may employ a cellular-based radio technology, and with the base station 114b, which may employ an IEEE 802 radio technology.

Figure 1B:
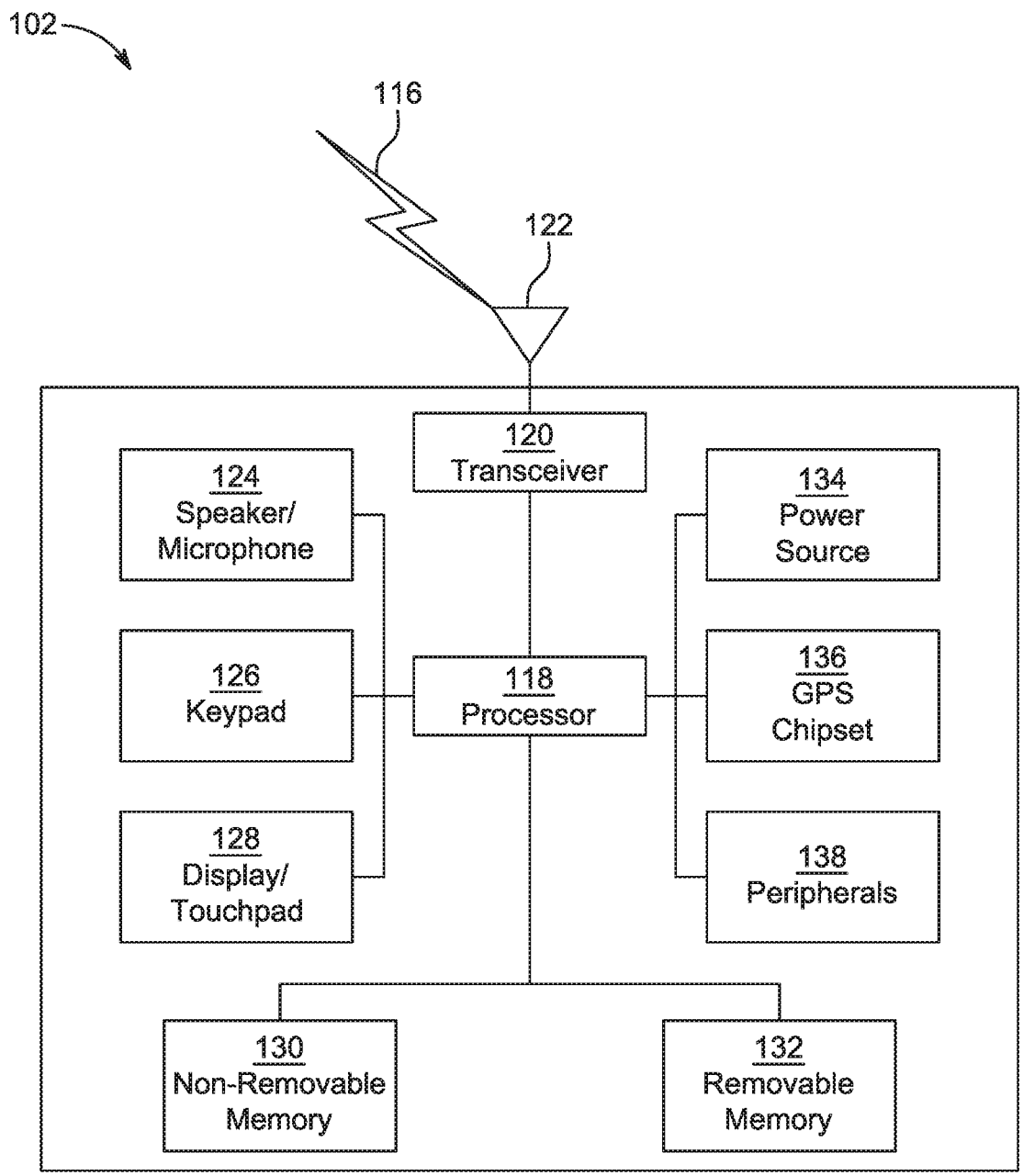
FIG. 1B is a system diagram illustrating an example wireless transmit/receive unit (WTRU) that may be used within the communications system illustrated in FIG. 1A according to an embodiment.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors, the sensors may be one or more of a gyroscope, an accelerometer, a hall effect sensor, a magnetometer, an orientation sensor, a proximity sensor, a temperature sensor, a time sensor; a geolocation sensor; an altimeter, a light sensor, a touch sensor, a magnetometer, a barometer, a gesture sensor, a biometric sensor, and/or a humidity sensor.

The WTRU 102 may include a full duplex radio for which transmission and reception of some or all of the signals (e.g., associated with particular subframes for both the UL (e.g., for transmission) and downlink (e.g., for reception) may be concurrent and/or simultaneous. The full duplex radio may include an interference management unit 139 to reduce and or substantially eliminate self-interference via either hardware (e.g., a choke) or signal processing via a processor (e.g., a separate processor (not shown) or via processor 118). In an embodiment, the WTRU 102 may include a half-duplex radio for which transmission and reception of some or all of the signals (e.g., associated with particular subframes for either the UL (e.g., for transmission) or the downlink (e.g., for reception)).

Figure 1C:
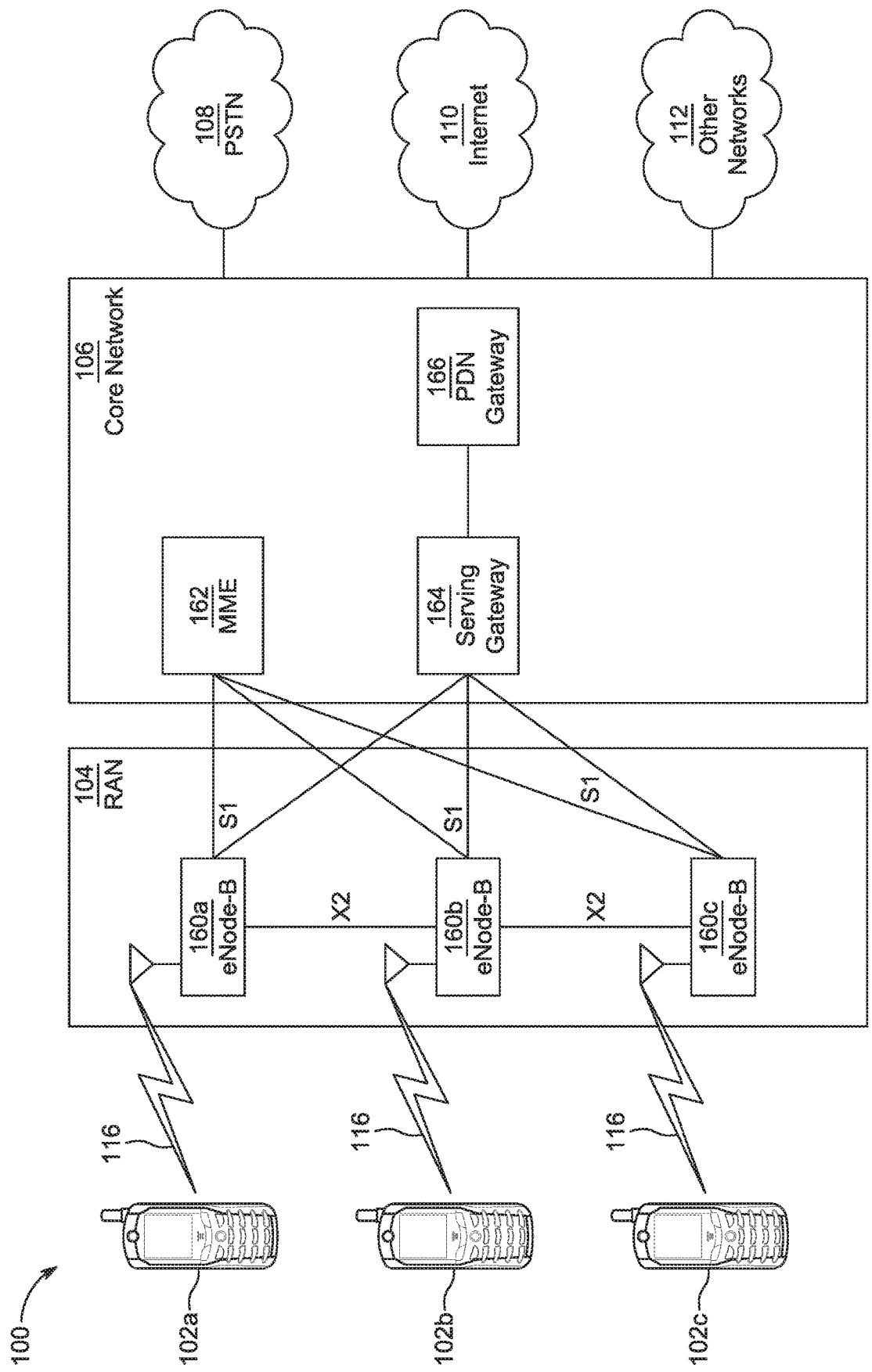
FIG. 1C is a system diagram illustrating an example radio access network (RAN) and an example core network (CN) that may be used within the communications system illustrated in FIG. 1A according to an embodiment.

FIG. 1C is a system diagram illustrating the RAN 104 and the CN 106 according to an embodiment. As noted above, the RAN 104 may employ an E-UTRA radio technology to communicate with the WTRUs 102a, 102b, 102c over the air interface 116. The RAN 104 may also be in communication with the CN 106.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and/or receive wireless signals from, the WTRU 102a.

Each of the eNode-Bs 160a, 160b, 160c may be associated with a particular cell (not shown) and may be configured to handle radio resource management decisions, handover decisions, scheduling of users in the UL and/or DL, and the like. As shown in FIG. 1C, the eNode-Bs 160a, 160b, 160c may communicate with one another over an X2 interface.

The CN 106 shown in FIG. 1C may include a mobility management entity (MME) 162, a serving gateway (SGW) 164, and a packet data network (PDN) gateway (or PGW) 166. While each of the foregoing elements are depicted as part of the CN 106, it will be appreciated that any of these elements may be owned and/or operated by an entity other than the CN operator.

The MME 162 may be connected to each of the eNode-Bs 162a, 162b, 162c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may provide a control plane function for switching between the RAN 104 and other RANs (not shown) that employ other radio technologies, such as GSM and/or WCDMA.

The SGW 164 may be connected to each of the eNode Bs 160a, 160b, 160c in the RAN 104 via the S1 interface. The SGW 164 may generally route and forward user data packets to/from the WTRUs 102a, 102b, 102c. The SGW 164 may perform other functions, such as anchoring user planes during inter-eNode B handovers, triggering paging when DL data is available for the WTRUs 102a, 102b, 102c, managing and storing contexts of the WTRUs 102a, 102b, 102c, and the like.

The SGW 164 may be connected to the PGW 166, which may provide the WTRUs 102a, 102b, 102c with access to packet-switched networks, such as the Internet 110, to facilitate communications between the WTRUs 102a, 102b, 102c and IP-enabled devices.

The CN 106 may facilitate communications with other networks. For example, the CN 106 may provide the WTRUs 102a, 102b, 102c with access to circuit-switched networks, such as the PSTN 108, to facilitate communications between the WTRUs 102a, 102b, 102c and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have an access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width via signaling. The primary channel may be the operating channel of the BSS and may be used by the STAs to establish a connection with the AP. In certain representative embodiments, Carrier Sense Multiple Access with Collision Avoidance (CSMA/CA) may be implemented, for example in in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHz, 80 MHz, and/or 160 MHz wide channels. The 40 MHz, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz and 20 MHz bandwidths in the TV White Space (TVWS) spectrum, and 802.11ah supports 1 MHz, 2 MHz, 4 MHz, 8 MHz, and 16 MHz bandwidths using non-TVWS spectrum. According to a representative embodiment, 802.11ah may support Meter Type Control/Machine-Type Communications, such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHz, 4 MHz, 8 MHz, 16 MHz, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode), transmitting to the AP, the entire available frequency bands may be considered busy even though a majority of the frequency bands remains idle and may be available.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 1D:
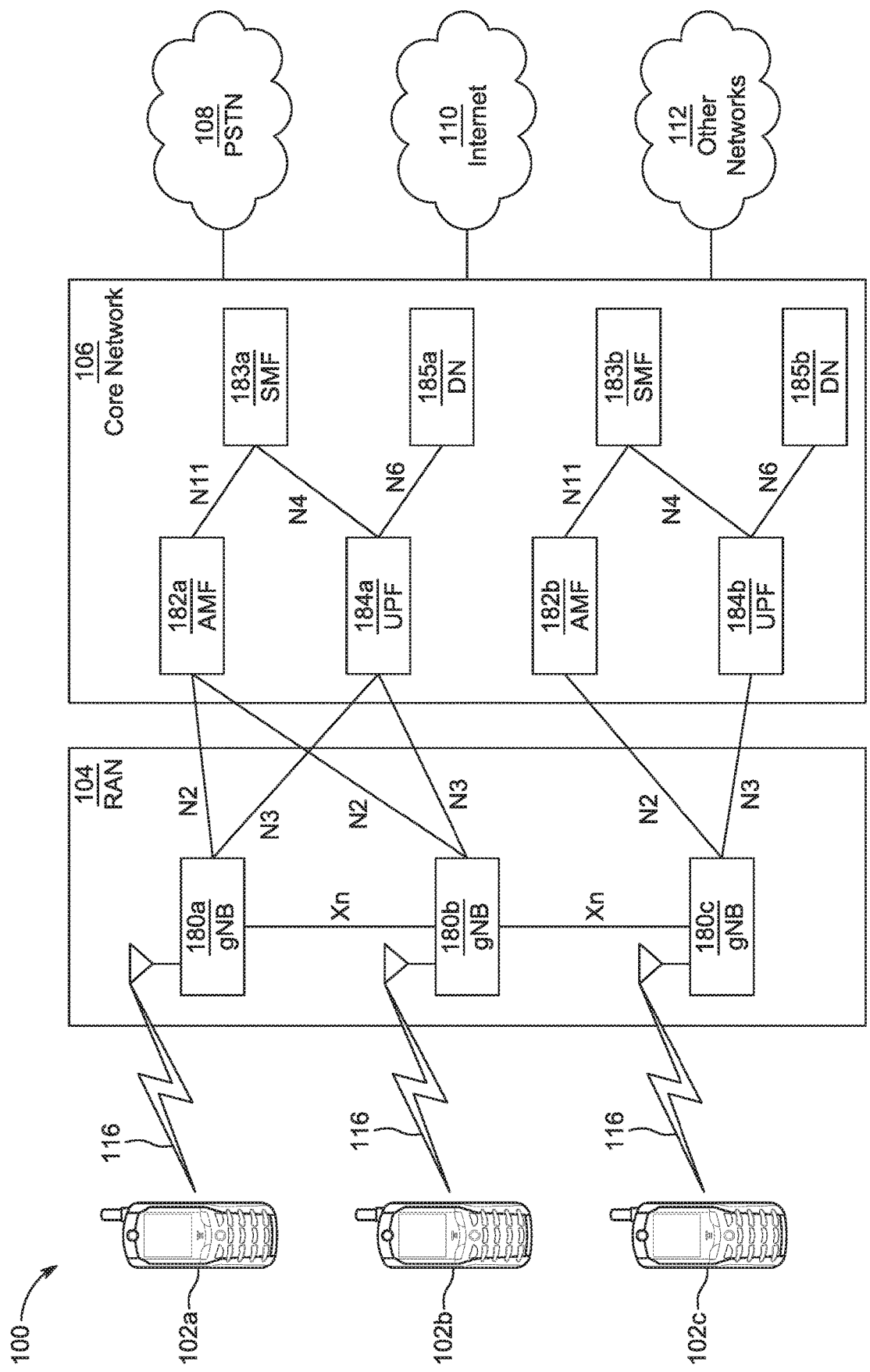
FIG. 1D is a system diagram illustrating a further example RAN and a further example CN that may be used within the communications system illustrated in FIG. 1A according to an embodiment.

FIG. 1D is a system diagram illustrating the RAN 113 and the CN 115 according to an embodiment. As noted above, the RAN 113 may employ an NR radio technology to communicate with the WTRUs 102a, 102b, 102c over the air interface 116. The RAN 113 may also be in communication with the CN 115.

The RAN 113 may include gNBs 180a, 180b, 180c, though it will be appreciated that the RAN 113 may include any number of gNBs while remaining consistent with an embodiment. The gNBs 180a, 180b, 180c may each include one or more transceivers for communicating with the WTRUs 102a, 102b, 102c over the air interface 116. In one embodiment, the gNBs 180a, 180b, 180c may implement MIMO technology. For example, gNBs 180a, 108b may utilize beamforming to transmit signals to and/or receive signals from the gNBs 180a, 180b, 180c. Thus, the gNB 180a, for example, may use multiple antennas to transmit wireless signals to, and/or receive wireless signals from, the WTRU 102a. In an embodiment, the gNBs 180a, 180b, 180c may implement carrier aggregation technology. For example, the gNB 180a may transmit multiple component carriers to the WTRU 102a (not shown). A subset of these component carriers may be on unlicensed spectrum while the remaining component carriers may be on licensed spectrum. In an embodiment, the gNBs 180a, 180b, 180c may implement Coordinated Multi-Point (CoMP) technology. For example, WTRU 102a may receive coordinated transmissions from gNB 180a and gNB 180b (and/or gNB 180c).

The WTRUs 102a, 102b, 102c may communicate with gNBs 180a, 180b, 180c using transmissions associated with a scalable numerology. For example, the OFDM symbol spacing and/or OFDM subcarrier spacing may vary for different transmissions, different cells, and/or different portions of the wireless transmission spectrum. The WTRUs 102a, 102b, 102c may communicate with gNBs 180a, 180b, 180c using subframe or transmission time intervals (TTIs) of various or scalable lengths (e.g., containing varying number of OFDM symbols and/or lasting varying lengths of absolute time).

The gNBs 180a, 180b, 180c may be configured to communicate with the WTRUs 102a, 102b, 102c in a standalone configuration and/or a non-standalone configuration. In the standalone configuration, WTRUs 102a, 102b, 102c may communicate with gNBs 180a, 180b, 180c without also accessing other RANs (e.g., such as eNode-Bs 160a, 160b, 160c). In the standalone configuration, WTRUs 102a, 102b, 102c may utilize one or more of gNBs 180a, 180b, 180c as a mobility anchor point. In the standalone configuration, WTRUs 102a, 102b, 102c may communicate with gNBs 180a, 180b, 180c using signals in an unlicensed band. In a non-standalone configuration WTRUs 102a, 102b, 102c may communicate with/connect to gNBs 180a, 180b, 180c while also communicating with/connecting to another RAN such as eNode-Bs 160a, 160b, 160c. For example, WTRUs 102a, 102b, 102c may implement DC principles to communicate with one or more gNBs 180a, 180b, 180c and one or more eNode-Bs 160a, 160b, 160c substantially simultaneously. In the non-standalone configuration, eNode-Bs 160a, 160b, 160c may serve as a mobility anchor for WTRUs 102a, 102b, 102c and gNBs 180a, 180b, 180c may provide additional coverage and/or throughput for servicing WTRUs 102a, 102b, 102c.

Each of the gNBs 180a, 180b, 180c may be associated with a particular cell (not shown) and may be configured to handle radio resource management decisions, handover decisions, scheduling of users in the UL and/or DL, support of network slicing, dual connectivity, interworking between NR and E-UTRA, routing of user plane data towards User Plane Function (UPF) 184a, 184b, routing of control plane information towards Access and Mobility Management Function (AMF) 182a, 182b and the like. As shown in FIG. 1D, the gNBs 180a, 180b, 180c may communicate with one another over an Xn interface.

The CN 115 shown in FIG. 1D may include at least one AMF 182a, 182b, at least one UPF 184a, 184b, at least one Session Management Function (SMF) 183a, 183b, and possibly a Data Network (DN) 185a, 185b. While each of the foregoing elements are depicted as part of the CN 115, it will be appreciated that any of these elements may be owned and/or operated by an entity other than the CN operator.

The AMF 182a, 182b may be connected to one or more of the gNBs 180a, 180b, 180c in the RAN 113 via an N2 interface and may serve as a control node. For example, the AMF 182a, 182b may be responsible for authenticating users of the WTRUs 102a, 102b, 102c, support for network slicing (e.g., handling of different PDU sessions with different requirements), selecting a particular SMF 183a, 183b, management of the registration area, termination of NAS signaling, mobility management, and the like. Network slicing may be used by the AMF 182a, 182b in order to customize CN support for WTRUs 102a, 102b, 102c based on the types of services being utilized WTRUs 102a, 102b, 102c. For example, different network slices may be established for different use cases such as services relying on ultra-reliable low latency (URLLC) access, services relying on enhanced massive mobile broadband (eMBB) access, services for machine type communication (MTC) access, and/or the like. The AMF 162 may provide a control plane function for switching between the RAN 113 and other RANs (not shown) that employ other radio technologies, such as LTE, LTE-A, LTE-A Pro, and/or non-3GPP access technologies such as WiFi.

The SMF 183a, 183b may be connected to an AMF 182a, 182b in the CN 115 via an N11 interface. The SMF 183a, 183b may also be connected to a UPF 184a, 184b in the CN 115 via an N4 interface. The SMF 183a, 183b may select and control the UPF 184a, 184b and configure the routing of traffic through the UPF 184a, 184b. The SMF 183a, 183b may perform other functions, such as managing and allocating WTRU IP address, managing PDU sessions, controlling policy enforcement and QoS, providing downlink data notifications, and the like. A PDU session type may be IP-based, non-IP based, Ethernet-based, and the like.

The UPF 184a, 184b may be connected to one or more of the gNBs 180a, 180b, 180c in the RAN 113 via an N3 interface, which may provide the WTRUs 102a, 102b, 102c with access to packet-switched networks, such as the Internet 110, to facilitate communications between the WTRUs 102a, 102b, 102c and IP-enabled devices. The UPF 184, 184b may perform other functions, such as routing and forwarding packets, enforcing user plane policies, supporting multi-homed PDU sessions, handling user plane QoS, buffering downlink packets, providing mobility anchoring, and the like.

The CN 115 may facilitate communications with other networks. For example, the CN 115 may include, or may communicate with, an IP gateway (e.g., an IP multimedia subsystem (IMS) server) that serves as an interface between the CN 115 and the PSTN 108. In addition, the CN 115 may provide the WTRUs 102a, 102b, 102c with access to the other networks 112, which may include other wired and/or wireless networks that are owned and/or operated by other service providers. In one embodiment, the WTRUs 102a, 102b, 102c may be connected to a local Data Network (DN) 185a, 185b through the UPF 184a, 184b via the N3 interface to the UPF 184a, 184b and an N6 interface between the UPF 184a, 184b and the DN 185a, 185b.

In view of FIGS. 1A-1D, and the corresponding description of FIGS. 1A-1D, one or more, or all, of the functions described herein with regard to one or more of: WTRU 102a-d, Base Station 114a-b, eNode-B 160a-c, MME 162, SGW 164, PGW 166, gNB 180a-c, AMF 182a-ab, UPF 184a-b, SMF 183a-b, DN 185a-b, and/or any other device(s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or may performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

5G New Radio (NR) systems are expected to use beamforming. Based on the general requirements set out by International Telecommunication Union Radio communication Sector (ITU-R), Next Generation Mobile Networks (NGMN) and $3^{rd}$ Generation Partnership Project (3GPP), a broad classification of the use cases for emerging 5G systems can be depicted as follows: Enhanced Mobile Broadband (eMBB), Massive Machine Type Communications (mMTC) and Ultra Reliable and Low latency Communications (URLLC). Different use cases may focus on different requirements such as higher data rate, higher spectrum efficiency, low power and higher energy efficiency, lower latency and higher reliability. A wide range of spectrum bands ranging from 700 MHz to 80 GHz are being considered for a variety of deployment scenarios.

It is well known that as the carrier frequency increases, the severe path loss becomes a crucial limitation to guarantee sufficient coverage. Transmission in millimeter wave (mmW) systems may additionally suffer from non-line-of-sight losses (e.g., diffraction loss, penetration loss, oxygen absorption loss, foliage loss, etc.). During initial access, the base station and WTRU may need to overcome these high path losses and discover each other. Utilizing dozens or even hundreds of antenna elements to generated beamformed signals is an effective way to compensate for the severe path loss by providing significant beamforming gain. Beamforming techniques may include digital, analogue and hybrid beamforming.

Long Term Evolution (LTE) systems may employ initial synchronization and the use of a broadcast channel(s). A cell search procedure may involve a WTRU acquiring time and frequency synchronization with a cell and detecting the cell identity (ID) associated with the cell. For example, LTE synchronization signals may be transmitted in the $0^{th}$ and $5^{th}$ subframes of every radio frame and may be used for time and frequency synchronization during initialization. As part of the system acquisition process, a WTRU may synchronize sequentially to the OFDM symbol, slot, subframe, half-frame, and/or radio frame based on the synchronization signals. Example synchronization signals may include, but are not limited to, any of the following signals: the Primary Synchronization Signal (PSS), which may be used to obtain slot, subframe and half-frame boundary and/or provide physical layer cell identity (PCI) within the cell identity group; and the Secondary Synchronization Signal (SSS), which may be used to obtain the radio frame boundary, and/or enable the WTRU to determine the cell identity group (e.g., ranging from 0 to 167).

Following a successful synchronization and PCI acquisition, the WTRU may decode the Physical Broadcast Channel (PBCH) with the help of cell specific reference signal (CRS) and acquire the master information block (MIB) information regarding system bandwidth, System Frame Number (SFN) and/or Physical Hybrid-automatic repeat request (ARQ) Indicator Channel (PHICH) configuration. LTE synchronization signals and PBCH may be transmitted continuously according to a predefined (e.g., standardized) periodicity.

LTE systems may employ a random access (RA) procedure. An eNode B and/or a WTRU may use a random access procedure in any of the following example cases: WTRU initial access (for example to a cell or eNode B); reset of uplink (UL) timing (e.g., to reset or align WTRU UL timing with respect to a certain cell); and/or reset of timing during handover (e.g., to reset or align WTRU timing with respect to the handover target cell). The WTRU may transmit a physical random access channel (PRACH) preamble sequence, at a power $P_{PRACH}$, which may be based on configured parameters and/or measurements, and using a time-frequency resource(s). Examples of configured parameters, which may be provided or configured by the eNode B, may include, but are not limited to include, any of the following parameters: initial preamble power (e.g., preambleInitialReceivedTargetPower); a preamble format based offset (e.g., deltaPreamble); a random access response window (e.g., ra-ResponseWindowSize); a power ramping factor (e.g., powerRampingStep); and/or a maximum number of retransmissions (e.g., preambleTransMax).

The PRACH resources (which may include preambles or sets of preambles and/or time/frequency resources which may be used for preamble transmission) may be provided or configured by the eNode B. The measurements may include path loss. The time-frequency resource(s) may be chosen by the WTRU from an allowed set or may be chosen by the eNode B and signaled to the WTRU. Following WTRU transmission of a preamble, if the eNode B detects the preamble, the eNode B may respond with a random access response (RAR). If the WTRU does not receive an RAR for the transmitted preamble (e.g., which may correspond to a particular preamble index and/or time/frequency resource) within an allotted time (e.g., ra-ResponseWindowSize), the WTRU may send another preamble at a later time, at a higher power, (for example, higher than the previous preamble transmission by powerRampingStep), such that the transmission power may be limited by a maximum power. For example, the maximum power may be a WTRU-configured maximum power which may be for the WTRU as a whole (for example PCMAX) or for a certain serving cell of the WTRU (for example PCMAX,c). The WTRU may wait again for receipt of an RAR from the eNode B. This sequence of transmitting and waiting may continue until the eNode B responds with an RAR or until the maximum number of random access preamble transmissions (for example, preambleTransMax) has been reached. The eNode B may transmit and the WTRU may receive the RAR in response to a single preamble transmission.

A particular instance of a random access procedure may be contention-based or contention-free. A contention-free procedure may be initiated by a request, for example from an eNode B, which may, for example, be via physical layer signaling such as a physical downlink control channel (PDCCH) order or by higher layer signaling such as an radio resource control (RRC) reconfiguration message (e.g., an RRC connection reconfiguration message), which may include mobility control information and may, for example, indicate or correspond to a handover request. For a contention-free procedure, for example initiated by PDCCH order in subframe n, the PRACH preamble may be transmitted in the first subframe (or the first subframe available for PRACH) n+k2 (e.g., k2≥6). When initiated by an RRC command, other delays may be specified (e.g., a minimum and/or maximum required or allowed delays may be specified). The WTRU may autonomously initiate a contention-based procedure for reasons which may include, for example, initial access, restoration of UL synchronization, or recovering from a radio link failure (RLF). For certain events, for example events other than recovery from radio link failure, it may not be defined or specified as to how long after such an event the WTRU may send the PRACH preamble.

For a contention-free random access (RA) procedure, a network-signaled PRACH preamble may be used, for example by a WTRU. For a contention-based RA procedure, the WTRU may autonomously choose a preamble where the preamble format and/or the time/frequency resource(s) available for preamble transmissions may be based on an indication or index (e.g., prach-confignIdex) which may be provided or signaled by the eNode B.

One of the preambles transmitted at the progressively higher transmit powers may be detected by the eNode B. An RAR may be sent by the eNode B in response to the detected preamble. A PRACH preamble may be considered a PRACH resource. For example, PRACH resources may include a PRACH preamble, time, and/or frequency resources. Herein, RACH resources and PRACH resources may be used interchangeably. RA, RACH, and PRACH may be used interchangeably. Herein, device, WTRU, eNode B and gNB may be used interchangeably.

NR systems may include unlicensed band operation. In wireless communication systems where a central node (e.g. gNB) serves a set of WTRUs, the opportunity to send transport blocks (TB) from the WTRUs to the central node may be administered by the central node. For example, the gNB may schedule individual WTRU UL transmission by assigning separate time-frequency resources to each WTRU and granting each resource to one WTRU. This arrangement for UL transmission may be referred to as grant-based UL transmission. In another example, a gNB may announce the presence of one or more time-frequency resources and allow a set of WTRUs to use each resource, hence allowing access without a specific UL grant (e.g., resulting in grant-free UL transmission).

Use cases considered during development of 3GPP NR may include URLLC, mMTC, or in a general sense eMBB communication. mMTC is designed to enable communication between devices that are low-cost, massive in number and battery-driven, and intended to support applications such as smart metering, logistics, and field and body sensors. URLLC is designed to make it possible for devices and machines to communicate with ultra-reliability, very low latency and high availability, making it ideal for vehicular communication, industrial control, factory automation, remote surgery, smart grids and public safety applications. eMBB focuses on enhancements to a variety of parameters such as data rate, delay and coverage of mobile broadband access.

In unlicensed bands, a gNB or a WTRU may perform a listen-before-talk (LBT) procedure before accessing the unlicensed wireless channel. The LBT procedure may be vary depending on the regulatory requirements of the unlicensed channel. For example, an LBT procedure may consist of a fixed- and/or random-duration interval where a wireless node (e.g. a gNB or a WTRU) listens to a medium and if the energy level detected from the medium is more than a threshold (e.g., where the threshold is specified by the regulator) the gNB or WTRU may refrain from transmitting any wireless signal; otherwise, the wireless node may transmit its desired signal after completion of the LBT procedure.

In some regulatory regimes, LBT procedures may be mandatory for unlicensed channel usage, and as a consequence various LBT categories were adopted in 3GPP Licensed Assisted Access (LAA) (Release 13), enhanced LAA (eLAA) (Release 14) and further enhanced LAA (feLAA) (Release 15). The LBT Category 4 (CAT 4) scheme (adopted in LAA/eLAA) has been identified as the preferred scheme for many use cases, such as those discussed above. The LBT CAT 4 procedure may start when an eNode B or gNB (or WTRU) control information or data to transmit in an unlicensed channel. The initiating device may conduct an initial clear channel assessment (CCA) to check if the channel is idle for a period of time (e.g., a sum of a predefined fixed period of time and a pseudo-random duration). The availability of the channel may be determined by comparing the level of energy detected (ED) across the bandwidth of the unlicensed channel to an energy threshold that is determined by the regulator.

According to the LBT CAT 4, if the channel is determined to be free, the transmission by the device may proceed. If the channel is determined to be in use, the device may conduct a slotted random back-off procedure, where a random number is selected from a specified interval called the contention window. A back-off countdown may be obtained and the channel may be verified if idle or not, and the transmission may be initiated when the back-off counter goes to zero. After the device (e.g., WTRU or gNB) has gained access to the channel, the device may only transmit for a limited duration referred to as the maximum channel occupancy time (MCOT). The CAT 4 LBT procedure with random backoff and variable contention window sizes may enable fair channel access and good coexistence with other Radio Access Technologies (RATs), such as Wi-Fi and other LAA networks.

In licensed assisted non-standalone access, an unlicensed band operation may rely on the assistance of a primary component carrier (PCC) in the licensed band to gain access to the unlicensed band. In New Radio in unlicensed spectrum (NR-U) standalone operation, all communications functions and features may be fulfilled on unlicensed bands including initial access by a WTRU (or more generally, a device). Initial access is essential for standalone operation. Due to spectrum characteristics and regulatory requirements (e.g., uncertainty of channel availability, the Occupied Channel Bandwidth (OCB) requirement), initial access in licensed band may need to be compatible with unlicensed band operation.

For RACH, NR supports multiple RACH preamble formats, including, for example, long PRACH formats with preamble length 839 and short PRACH format with preamble length 139. For unlicensed band operation, the cell range may be smaller than that of licensed band operation due to limited transmission power constraint. The short PRACH format may be more suitable for the relative small cell in NR-U unlicensed bands. During a RACH procedure, LBT may be performed. LBT failure may lead to performance degradation of RACH performance. LBT failure before PRACH preamble transmission may also have an impact on the RACH resource configuration. In addition, PRACH preamble transmission may need to fulfill the regulatory requirement of OCB. Preamble and RACH procedure for unlicensed band operation may address the impact of LBT and the requirement of OCB for NR-U.

Preamble and RACH procedures and systems for unlicensed band operation may address the impact of LBT and the OCB for NR-U requirements. For example, a RACH procedure may involve the exchange of messages between the WTRU and the gNB. For example, message 1 may be transmitted from the WTRU to the gNB and may include a RACH request and/or a RACH preamble, which may be used by the gNB to estimate transmission timing for the WTRU. The RAR may be included in message 2 from the gNB to the WTRU. Subsequent messages (e.g., message 3, and message 4) may be exchanged between the WTRU and gNB as part of the RACH procedure, for example to establish a RRC connection.

In an example, hybrid methods and counters for message 1 transmission may be used. A WTRU may not need to power ramp its PRACH transmission due to a hidden node in NR-U, and power ramping may not help. Instead, the WTRU may send multiple preambles over time. Preamble power ramping may depend on LBT and/or latency requirement and may be a function of LBT and/or latency requirement. In an example, a WTRU may using any of the following approaches for PRACH transmission: transmit the same preamble multiple times (approach 1); transmit multiple different preambles (approach 2); and/or use power ramping for transmitting message 1 (approach 3). The WTRU may randomly select one of above approaches for PRACH transmission for message 1 transmission for each transmission. The WTRU may use a preconfigured pattern for message 1 transmission for each transmission. For example, the WTRU may transmit message 1 using the following pattern or order: approach 1->approach 2->approach 3, or approach 3->approach 2->approach 1, or approach 1->approach 3 (skipping 2). The WTRU may use one, a subset, or all of above (approach 1, approach 2 and approach 3) in different transmission orders.

Figure 2:
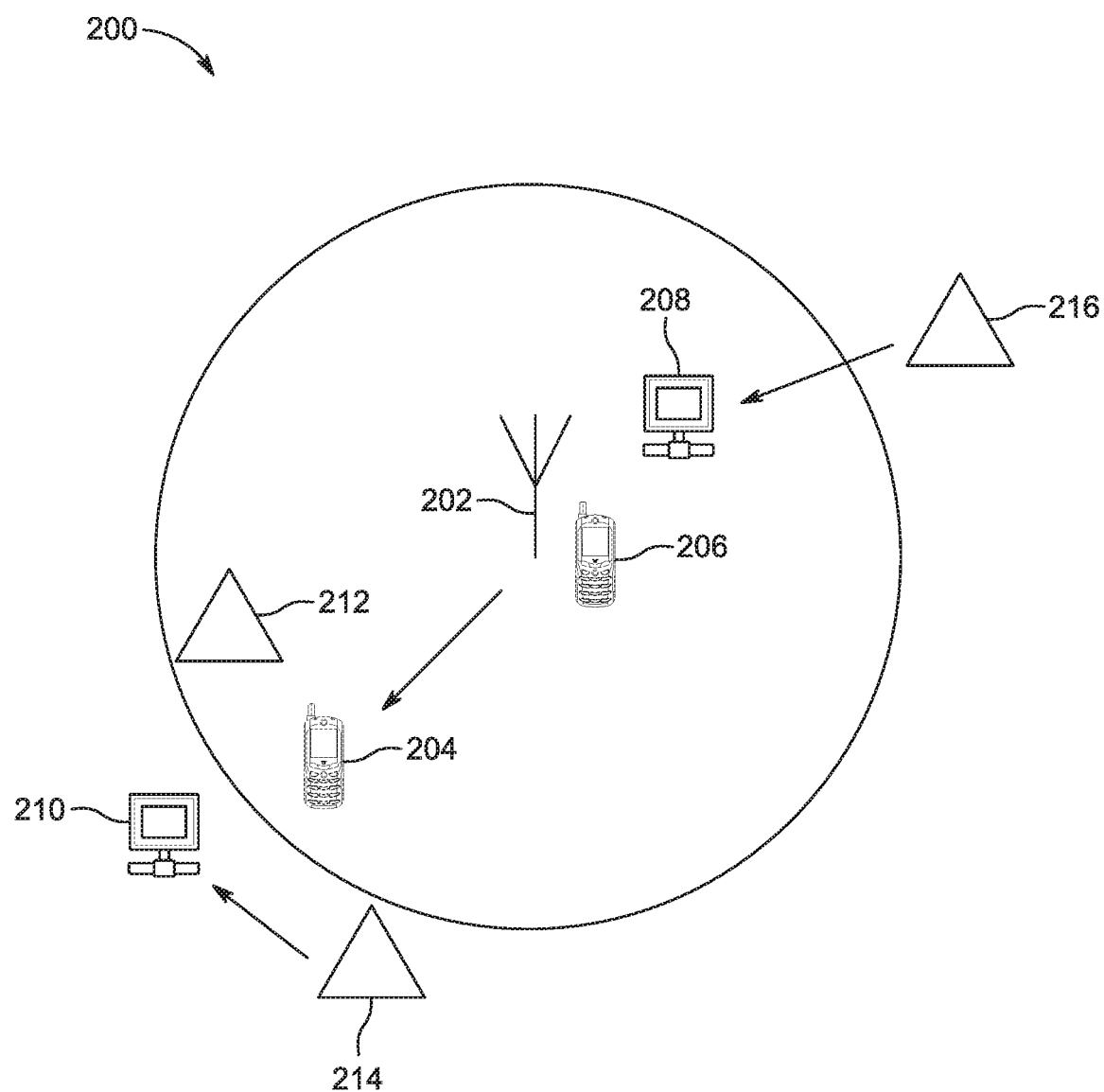
FIG. 2 is a system diagram of an example wireless network where WTRUs may experience interference from a hidden node, for example during a random access channel (RACH) procedure.

In NR system, if the WTRU cannot receive a RAR within the RAR window, the WTRU may retransmit message 1 (Msg1) with power ramping and/or beam switching. However, in an unlicensed band, the failure of receiving RAR may or may not be caused by low transmitting power or selective fading or impropriate beam, but may be caused by the interference from WiFi hidden nodes, as shown in FIG. 2. FIG. 2 is a system diagram of an example wireless network 200 where WTRUs may experience interference from a hidden node, for example during a RACH procedure. In the example of FIG. 2, the wireless network 200 may include a gNB 202, WTRUs 204, 206, 208, 210 (e.g., WTRUs 208 and 210 may be WiFi STAs and WTRUs 204 and 206 may be UEs), and APs 212, 214, 216 (and other devices not shown). The arrows indicate example message transmissions, such that not all transmissions are shown. The interference from transmissions between WTRU 210 and AP 214 may cause failure of the WTRU 204 receiving a RAR (e.g., in Msg2) from gNB 202 (where the WTRU 210 is causing a hidden node interference to WTRU 204). In this case, the power ramping or beam switching of the transmission of Msg1 from eNode B 202 to WTRU 204 may not be helpful in avoiding the hidden node interference. Moreover, power ramping of transmission of Msg1 from eNode B 202 to WTRU 204 may cause interference to the gNB 202 receiving other WTRUs' respective Msg1 (e.g., from WTRU 206). Moreover, power ramping of transmission of Msg1 from eNode B 202 to WTRU 204 may cause interference to transmissions between WTRU 208 and AP 216, where gNB 202 may be a hidden node for communication between WTRU 208 and AP 216.

In an example, a WTRU may switch its receiving (Rx) beam for reception of RAR. However, a Rx beam switch may fail if there is a hidden node causing the WTRU to fail the reception of RAR. If the WTRU's failure to receive RAR is caused by channel fading, then the WTRU may ramp up the transmission power of its Msg1. If the WTRU's failure to receive RAR is caused by hidden nodes, then the WTRU may retransmit Msg1 without power ramping. However, the WTRU may not be able to differentiate between the possible causes for RAR reception failure when retransmitting Msg1. In other words, the WTRU may not know the reason that an RAR was not received.

In order to mitigate the impact of hidden nodes to RAR reception, the eNode B may transmit the RAR multiple times (e.g., twice) within the RAR window. In this case, for each transmission of Msg1, there is more than one opportunity to receive the RAR, and only when there are hidden nodes for both of the two opportunities, the WTRU will fail to receive the RAR. If the WTRU cannot receive the RAR within the RAR window, then the WTRU may retransmit Msg1 with power ramping. In another example, the WTRU may try to receive other RAT's signature (e.g., from a WiFi node) to differentiate the above causes for RAR failure. In another example, the WTRU may try to receive other RAT's signature (e.g., WiFi) during the RAR window to differentiate the above causes for RAR failure.

In an example, the WTRU may perform LBT before RAR reception to identify a hidden node issue. If the WTRU identifies a hidden node interference issue during (or prior to) RAR reception, the WTRU may retransmit the preamble without power ramping. In this case, the WTRU may maintain the power ramping counter the same or may not increase the counter for power ramping. If the WTRU does not detect a hidden node interference issue (e.g., by performing LBT), the WTRU may retransmit the preamble with power ramping. In this case, the WTRU may increase the power ramping counter.

RACH counters, which may include a preamble counter and/or a power ramping counter, may be used for RACH in NR-U. In NR, the WTRU may increase the power ramping counter for each preamble retransmission using the same transmission (Tx) beam. The WTRU may not increase power ramping counter for preamble retransmission when switching to a different Tx beam. In another example, the WTRU may increase the preamble counter for each preamble retransmission regardless of whether the same Tx beam is used or the retransmission switches to a different Tx beam.

In NR-U, the following examples mechanisms for RACH counters may be used. In an example, the WTRU may increase the power ramping counter for each preamble retransmission using the same Tx beam in the case that no indication of hidden node is detected. The WTRU may not increase the power ramping counter for each preamble retransmission using the same Tx beam in the case that a hidden node is indicated or detected. The WTRU may not increase the power ramping counter for preamble retransmission when switching to different Tx beam. The WTRU may increase the preamble counter for each preamble retransmission regardless of whether the same or a different beam is used and with or without hidden node indication. In an example, the WTRU may receive a hidden node indication (e.g., in medium access control (MAC) layer from Layer 1 (L1)) to determine whether to increase the power ramping counter or not. The gNB may transmit the RAR multiple times for the same Msg1 within the RAR window. In an example, the number of RAR signals transmitted may depend on an LBT performed, latency, and/or may be a function of LBT and/or latency requirement.

In an example, as part of managing RARs in NR-U, the RAR may be a function of LBT and/or latency. In an example, after sending Msg1, the WTRU may monitor the RAR window for a RAR. In an unlicensed band, delivery of a RAR may take a longer time and/or experience a greater delay than in the licensed based. In an example, in an unlicensed band, the gNB may perform LBT before transmitting RAR. If LBT fails, which may indicate a hidden node interference, the gNB may postpone the transmission of the RAR. The hidden node interference may further cause failure of reception of the RAR by the WTRU. Thus, successfully receiving RAR in an unlicensed band may take a longer time as compared with a licensed band. Thus, RAR window sizes, to include time for LBT, may be used for RAR transmission in an unlicensed band, and may result in different RAR window sizes compared to the licensed band.

Figure 3:
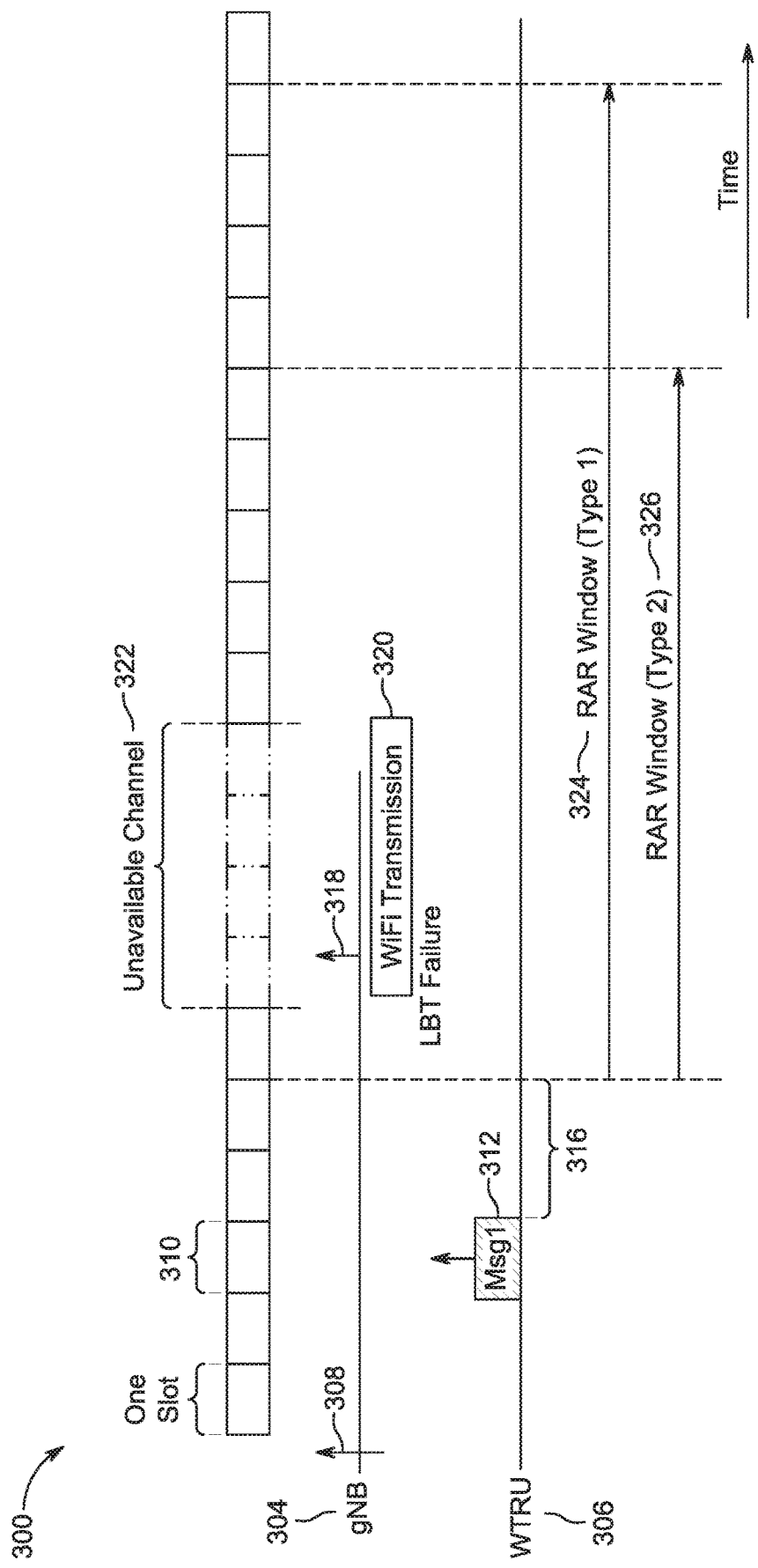
FIG. 3 is a signaling diagram of an example random access response (RAR) procedure, which may be used for example in NR-U systems including licensed and/or unlicensed bands.

To provide more opportunity for a gNB scheduling and transmitting RAR, a longer RAR window may be used in unlicensed band. In an example, in LTE, a RAR window length may be as large as 10 subframes. In NR, a RAR window length may be given in terms of number of slots. For NR-U (e.g., for unlicensed band), a RAR window may be given in terms of number of slots, and may include a greater number of slots than for licensed NR operation. Considering that the channel may not be available for NR-U between the end of the Msg1 transmission and RAR reception, the RAR window may be defined according to any of the following definitions: in terms of actually transmitted time slots of the gNB ("type 1"); or in terms of the number of slots regardless of whether the slot is available to NR-U or not ("type 2"). FIG. 3 is a signaling diagram of an example RAR procedure 300 that may be used for example in NR-U systems including licensed and/or unlicensed bands. In the example of FIG. 3, the gNB 304 may perform LBT 308 and in this example not detect a hidden node. The WTRU 306 may send Msg1 312, during RACH occasion 310 (e.g., with a duration of one or more time slots). A minimum time gap 316 may be set between the transmission of Msg1 312 and the RAR window (period of time where Msg2 may be transmitted). The WTRU 306 may monitor for a Msg2 (not shown) that may be sent by the gNB 304 during the RAR window 324 or 326.

In the example of FIG. 3, the RAR window 324 according to RAR window type 1 may be for example 10 slots, such that the interval 322 during which the channel is unavailable due to WiFi transmission 320 may not be taken into account. An LBT failure 318 may occur if there is interference, such as interference caused by a hidden node (e.g., a WiFi transmission). The RAR window 326 according to RAR window type 2 may be for example 6 slots by taking into account the interval 322 during which the channel is unavailable due to WiFi transmission 320. A different configurable window such as a longer RAR window may be used in NR-U. The RAR window size may depend on LBT and/or latency requirement and/or may be a function of LBT and latency requirement.

In an example, message 3 (Msg3) RA procedures may include a multi-grant based hybrid automatic repeat request (HARQ). In NR and NR-U, HARQ may be inefficient due to collisions. For example, if collision occurs, a retransmission may be wasted, and may continue to fail for any number of retransmissions due to the collision. Enhanced HARQ for Msg3 may include configuring or assigning multiple grants for time domain and/or frequency domain scheduling. A control channel (e.g., PDCCH) may be used for ACK/NACK for retransmission for Msg3.

In NR and NR-U, WTRUs in the same overlapped area of beams may report the same RA preamble, which may result in collision if two or more WTRUs select the same RACH occasion. In an example, if WTRU A and WTRU B both send the same preamble on the same RACH occasion, they may receive the same UL grant from the gNB in the same RAR, and each send Msg3 in the same UL resource, which may cause collision. With the collision, the gNB may successfully decode one, or the other, or both of the Msg3 from WTRU A and/or the Msg3 from WTRU B. If the gNB successfully decodes both or one of the Msg3s, the gNB may send an ACK and Msg4 with (one of) the contention resolution ID(s) in the Msg3(s). The WTRU (WTRU A and/or B) that receives Msg4 and finds that the contention resolution ID is not for that WTRU may restart the RACH procedure. If the gNB does not successfully decode any of the Msg3s, the gNB may send feedback to the WTRU(s) such as a NACK and/or a PDCCH with UL grant for Msg3 retransmission. In this case, WTRU A and/or WTRU B may gain receive the same UL grant for the retransmission. Thus, no matter how many retransmissions of Msg3 occur, the gNB may not be able to successfully decode any of the Msg3s due to the collision of the transmissions of Msg3 on the same UL resource from WTRUs A and B. Thus, in this case, the retransmission of Msg3 may not be helpful. In an example, to prevent the collisions, the gNB may stop the retransmission sooner and/or may assign different UL grants for different WTRUs.

In an example, in order to stop the cycle of retransmissions caused by collision, different UL grants may be configured or assigned for different WTRUs. The gNB may need to know whether the collision has occurred. However, the gNB may not be able to determine whether the collision happened. There may be no information that can be used to identify WTRU A from WTRU B, from the perspective of the gNB, prior to successfully receiving Msg3 from WTRU A or WTRU B. Thus, HARQ schemes may not be able to directly solve the collision issue before a WTRU successfully receives Msg3.

Multiple UL grants for Msg3 retransmission may be used to mitigate collisions during a RACH occasion. For example, a WTRU may randomly select one of the UL grants to perform the Msg3 retransmission. As such, the probability of collision during retransmission may be reduced. The WTRU may transmit Msg3 based on more than one grant. This may be used for same-slot scheduling or operation. In the case of multiple UL grants, the WTRU may (re)transmit Msg3 based on one UL grant (e.g., which may be selected randomly by the WTRU). In an example, the WTRU may randomly (re)transmit Msg3 based on different UL grants alternatingly for each retransmission. Multiple UL grants may be treated as another redundancy version for HARQ retransmission. The WTRU may transmit Msg3 based on a single grant. A single grant may be used for the same slot or cross-slot scheduling or operation. In the case of a single grant, the WTRU may transmit Msg3 based on one UL grant in a slot (e.g., which may be selected randomly by the WTRU). The WTRU may transmit Msg3 based on different UL grant alternatingly in a slot for each retransmission. Multiple UL grants may be treated as another redundancy version for HARQ retransmission. For example, the WTRU may use a first grant to transmit Msg3 in slot x and a second grant to transmit Msg3 in slot y. Same slot or cross-slot scheduling may be used. The value of x may be the same or different from the value of y. Any combination of the above approaches may be used for transmission and retransmission of Msg3.

In an example, message 4 (Msg4) RA procedures may include retransmission-based Msg4 transmission. In LTE, after (re)transmitting Msg3, a WTRU may initiate a contention resolution timer. If the contention resolution timer runs out and the WTRU hasn't received Msg4, then the WTRU may restart the PRACH procedure, which may incur a significant delay. In NR-U, a WTRU may perform HARQ for Msg4 based on LBT (e.g., in the case that usage of the channel is detected during LBT). In this case, enhanced HARQ for Msg4 may be used as described below. No HARQ for Msg4 may seem inefficient because the WTRU may start the PRACH procedure from scratch by sending an RA preamble or Msg1 transmission. An efficient RACH procedure may include performing a HARQ procedure for Msg4 based on LBT.

When performing HARQ for Msg4 (re)transmission, for the case where the gNB may transmit Msg4 but the WTRU does not receive it, the gNB may retransmit Msg4 and the WTRU may receive the retransmission successfully. The approach where the gNB retransmits Msg4 directly may reduce the RACH delay compared to the WTRU restarting preamble transmission.

Figure 4:
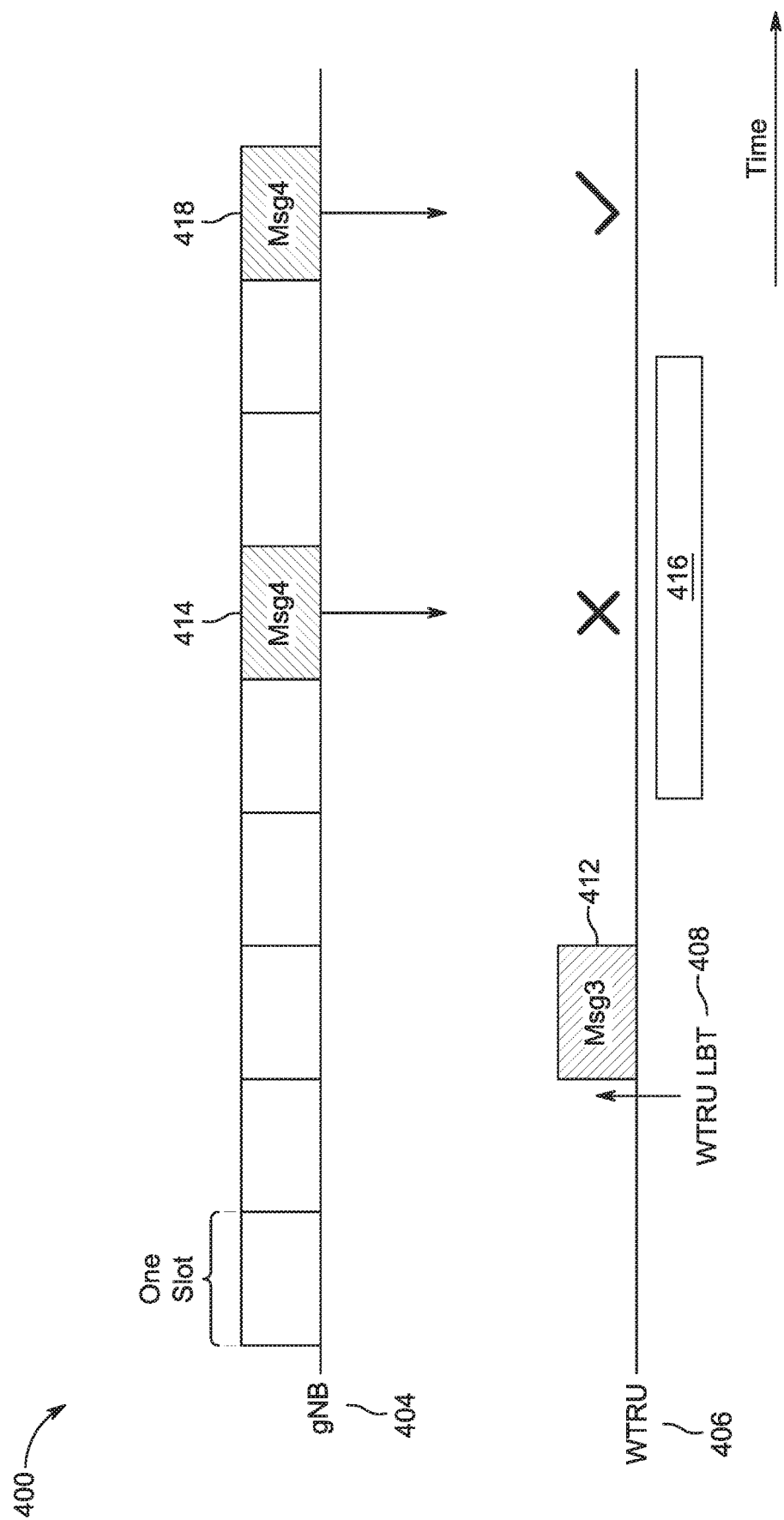
FIG. 4 is a signaling diagram of an example RACH message 4 (Msg4) retransmission procedure.

In unlicensed band (and in the licensed band), a WTRU may fail to receive Msg4 due to interference by a hidden, as shown in the example of FIG. 4. FIG. 4 is a signaling diagram of an example RACH Msg4 retransmission procedure 400. In an example, the gNB 404 may correspond to gNB 202 and WTRU 406 may correspond to WTRU 204 in FIG. 2.

With reference to FIG. 4, the WTRU 406 may perform LBT 408 and send Msg3 412 to the gNB 404. The gNB 404 may receive Msg3 412 and transmit Msg4 414 to the WTRU 406. In this example, at the same time that gNB transmits Msg4 414, the hidden nodes (e.g., AP 214 and STA 210 in FIG. 2) in coexisting systems (e.g., a WiFi network) may be transmitting message(s) 416 and generating interference to the WTRU 406 resulting in the WTRU 406 failing to decode Msg4 412. If the gNB 404 retransmits Msg4 418, the WTRU 406 may successfully receive the retransmission, for example without the WTRU retransmitting the RA preamble again. Thus, by retransmitting Msg4 efficiently, the delay of RACH may be reduced.

Example procedures may be used for retransmitting Msg4. In an example approach, the WTRU may send ACK/NACK to the gNB for the reception of Msg4, and the gNB may decide whether or not to retransmit Msg4 according to the received ACK/NACK (e.g., in NR or NR-U systems). In another example approach, the gNB may transmit Msg4 multiple times using the predefined resources, and the WTRU may not send feedback ACK/NACK. In this case, multiple resources may be configured for multiple Msg4 (re)transmissions. In another example, Msg4 may be sent based on a ACK/NACK feedback from the WTRU. For example, the WTRU may use Msg1 for ACK/NACK feedback. In another example, the WTRU may use an additional control channel for ACK/NACK feedback. In another example, the WTRU may use Msg3 for ACK/NACK feedback. Same or different control resource set (CORESET) may be configured for HARQ transmission and/or retransmission. In an example, configuration for Msg4 HARQ (e.g., ACK/NACK feedback from WTRU for Msg4, CORESET for Msg4 HARQ, and/or multiple resources for multiple Msg4 (re)transmissions) may be indicated in the NR-PBCH, the RAR, the remaining minimum system information (RMSI), and/or the other system information (OSI).

In an example, service-driven physical random access may include latency-driven LBT. Upon receiving a configuration for PRACH resource(s), a WTRU may or may not perform LBT (e.g., for a window duration Z) on the PRACH resource(s). The WTRU may determine whether or not to perform LBT on PRACH resource(s) based, at least on part, on service types (e.g., according to use cases such as URLLC or eMBB) and/or of service requirements including, but not limited to, latency (e.g., for eMBB there may be no latency requirement for RACH and for URLLC there may be a latency requirement for RACH) and/or performance (e.g., for RACH for eMBB there may be no strict performance requirement, and for RACH for URLLC there may be a higher performance requirement). The service type and/or service requirements may be determined, for example, based on the PRACH configuration. A WTRU may perform LBT for a number of iterations W before transmission of PRACH messages, such that the number of iterations W may be a function of service types and/or of service requirements including, but not limited to, latency (e.g., for eMBB there may be no latency requirement for RACH and for URLLC there may be a latency requirement for RACH) and/or performance.

In an example, a WTRU may not perform LBT before transmitting PRACH messages for low latency services (e.g., URLLC), and the WTRU may perform LBT before transmitting PRACH messages for non-URLLC type or regular service or traffic (e.g., eMBB). For example, a WTRU may send a request signal to request a PRACH grant with or without performing LBT first. For example, the WTRU may use an interference-resistant or noise-resistant signal or sequence (e.g., scrambling or spreading signal) to request the gNB to schedule a PRACH resource(s) for the WTRU. For example, the interference-resistant or noise-resistant sequence may be along sequence or a short sequence and may be a spreading sequence, scrambling sequence, preamble sequence or other type of sequence or combination of sequences. The interference-resistant or noise-resistant sequence may be robust against the interference from other RATs, such as WiFi user(s), when NR-U and WiFi coexist in the same band or spectrum.

In an example, RACH latency may be reduced by performing a RACH procedure immediately following a synchronization signal (SS) or PBCH transmission with (or without) LBT. Performing RACH immediately following an SS/PBCH transmission may reduce the duration of LBT and RACH delay due to LBT may be reduced. In the case that the WTRU can successfully decode a PBCH (e.g., determined based on a cyclic redundancy check (CRC) pass), the WTRU may assume that there is no significant interference or hidden node issue and thus the WTRU need not perform LBT.

In an example, upon successful reception of a SS/PBCH block or discovery reference signal (DRS), the WTRU may skip LBT or clear channel assessment (CCA) and immediately proceed with a transmission (e.g., PRACH preamble transmission) in response to the received signal or channel (e.g., SS/PBCH block or DRS reception). If RACH resource is configured immediately after the WTRU receives a SS or PBCH, the WTRU may send RACH preambles, without performing LBT, if the WTRU can decode PBCH. In an example, a RACH occasion may be configured immediately following SSB transmission within a slot, min-slot or non-slot. In an example, RACH resources may be associated with SS/PBCH block or DRS and may be available to the WTRU immediately following the reception of the SS/PBCH block or DRS (e.g., the WTRU may use the resources to send a PRACH preamble transmission following the SS/PBCH block or DRS). In another example, RACH resources may be indicated to WTRU by down control information (DCI) (e.g., via PDCCH or enhanced PDCCH (e-PDCCH)) and the indicated RACH resources may be available to the WTRU immediately following the reception of the SS/PBCH block or DRS. In another example, RACH resources may be indicated to the WTRU by the gNB in the remaining minimum system information (RMSI), other system information (OSI) or paging, and the indicated RACH resources may be available to the WTRU immediately following the reception of the SS/PBCH block or DRS. In another example, RACH resources may be indicated to the WTRU by the SS/PBCH block or DRS (e.g., where an indication may be included in the SS, PBCH or DRS) and the indicated RACH resources may be available to the WTRU immediately following the reception of the SS/PBCH block or DRS. The above example methods for indicating or configuring RACH resources may be used for new RACH resources and/or additional RACH resources (i.e., where other RACH resources are already available).

Figure 5A:
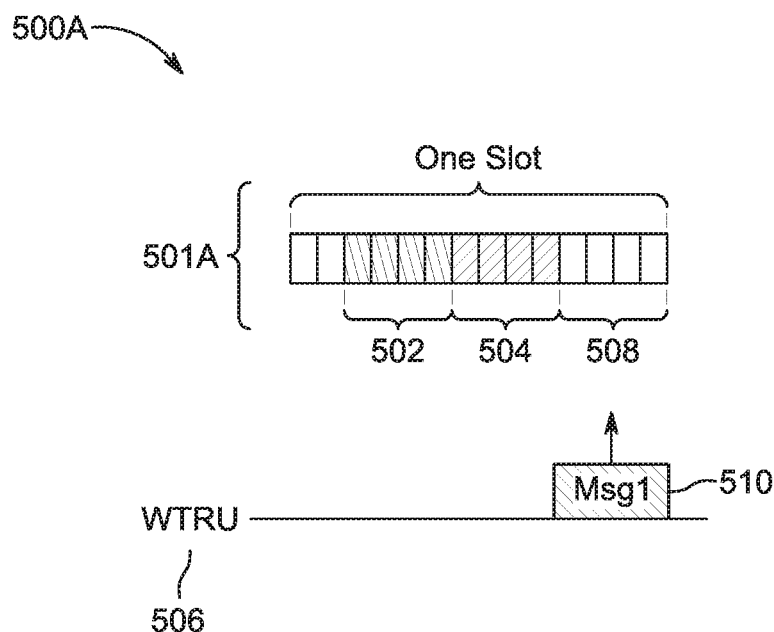
FIG. 5A shows an example RACH procedure with reduced RACH delay.
Figure 5B:
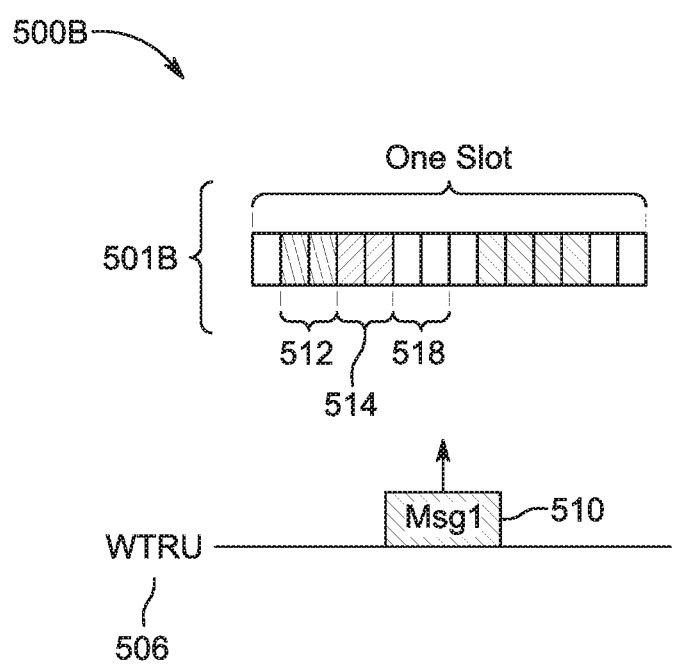
FIG. 5B shows another example RACH procedure with reduced RACH delay.

FIG. 5A and FIG. 5B show example RACH procedures 500A and 500B with reduced RACH delay. In the examples of FIG. 5A and FIG. 5B, an example NR frame structures 501A and 501B are shown, where one slot includes 14 OFDM symbols. In the examples of FIG. 5A and FIG. 5B, two SS blocks (SSBs) are transmitted per slot (SSBs 502 and 504 in FIG. 5A and SSBs 512 and 514 in FIG. 5B). In FIG. 5A, the subcarrier spacing (SCS) of the SSBs 502 and 504 is the same as the SCS of PRACH 508. In FIG. 5B, the SCS of the SSBs 512 and 514 is twice the SCS of PRACH 518 (e.g., the larger the SCS, the shorter the symbol time duration). A WTRU 506 that correctly decodes the PBCH of SSB 504 (FIG. 5A) or SSB 514 (FIG. 5B) may send a preamble in Msg1 510 on the RACH occasion 508 (FIG. 5A) or RACH occasion 518 (FIG. 5B) immediately following the SSB 504 (FIG. 5A) or SSB 514 (FIG. 5B) without performing LBT. The frame structure 501B in FIG. 5B may require more frequent downlink-uplink (DL-UL) switching than the frame structure 501A in FIG. 5A.

Figure 6:
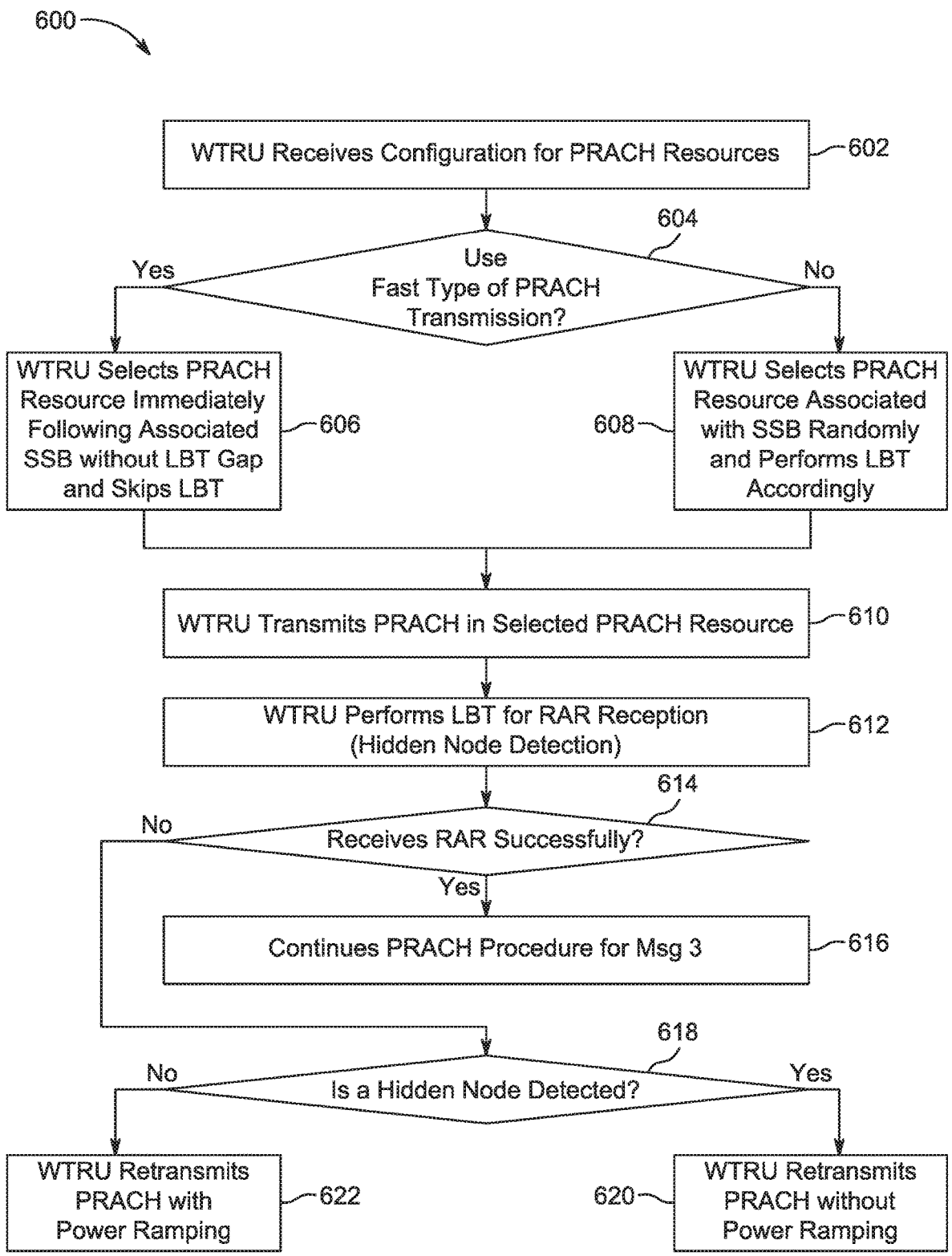
FIG. 6 is a flow diagram of an example PRACH procedure with reduced RACH delay, which may be performed by a WTRU.

FIG. 6 is a flow diagram of an example PRACH procedure 600 with reduced RACH delay, which may be performed by a WTRU. At 602, the WTRU may receive configuration of PRACH resources. At 604, the WTRU may determine if a fast type of PRACH transmission may be used, such that LBT is not used. The WTRU may make the determination at 604 based on, for example, service types and/or service requirements of the WTRU. For example, a fast type of PRACH transmission may be used for a URLLC service type and a normal type of PRACH transmission may be used for an eMBB service. If a fast type of PRACH transmission may not be used (but rather a normal type of PRACH transmission), then at 608, the WTRU may randomly select a PRACH resource associated with the SSB and perform LBT on the PRACH resource before transmitting on the PRACH resource.

At 610, the WTRU may transmit the PRACH in the selected PRACH resource (whether or not LBT was preformed). At 612, the WTRU may perform an LBT for RAR reception, in order to be able to detect hidden node interference. Note that the LBT for RAR reception (e.g., a second LBT) is different from the LBT that may, or may not, be performed on the PRACH (e.g., a first LBT). At 614, the WTRU may determine if the RAR was received successfully. If the RAR is received successfully, then at 616, the WTRU may continue the PRACH procedure, for example by transmitting Msg3. If the RAR is received successfully, then at 618, the WTRU may determine if a hidden node was detected based on the LBT for RAR reception performed at 612. If a hidden node is detected, then at 620 the WTRU may retransmit the PRACH without power ramping. If a hidden node is not detected, then at 622 the WTRU may retransmit the PRACH with power ramping.

Figure 7:
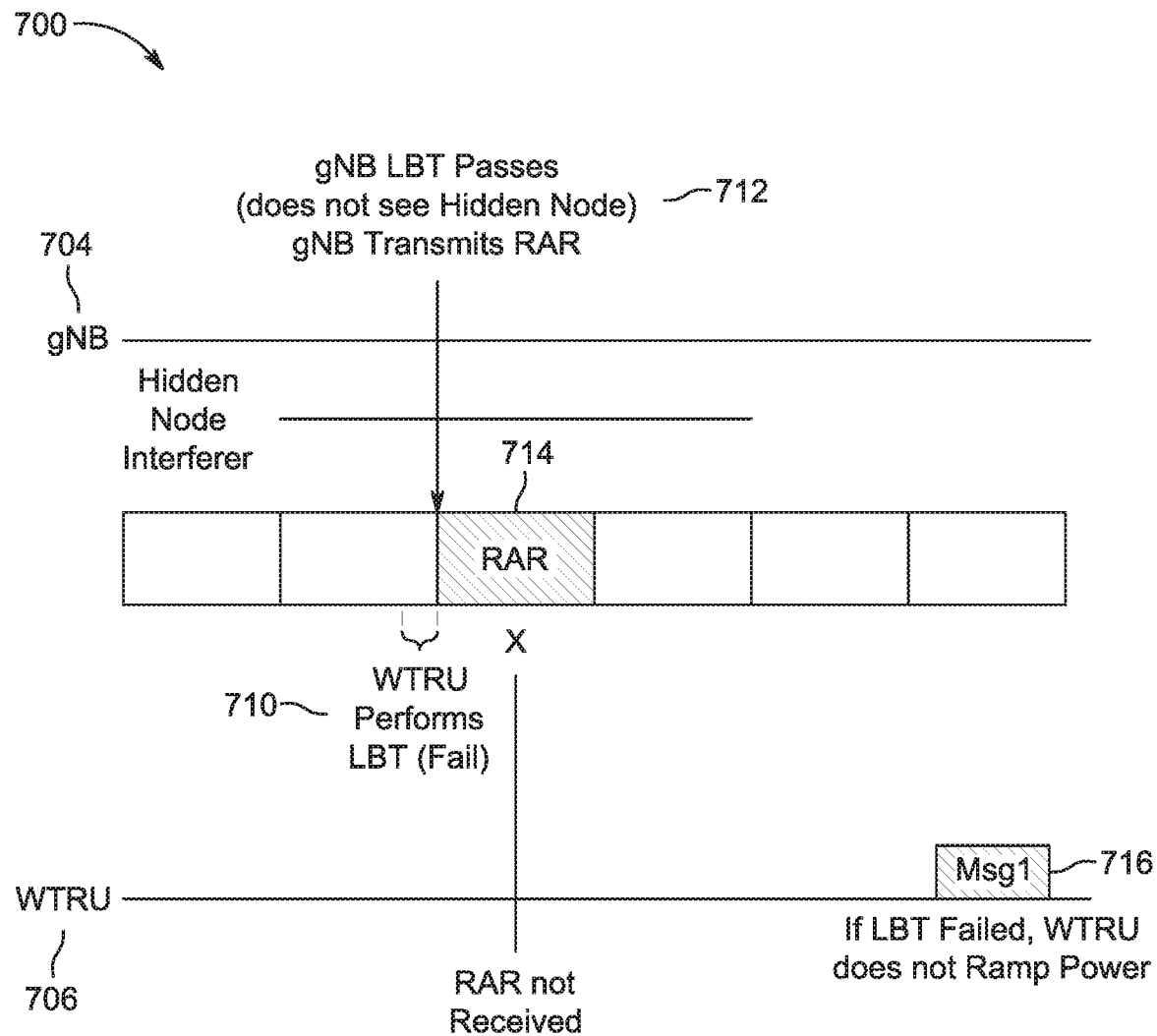
FIG. 7 is a signaling diagram of an example PRACH procedure employing techniques to reduce RACH delay and collision.

FIG. 7 is a signaling diagram of an example PRACH procedure 700 employing techniques to reduce RACH delay and collision. The WTRU 706 may perform LBT 710 and determine that there is a hidden node interference issue (LBT fail). However, the gNB 704 may also perform LBT 712 but not detect a hidden node interference issue (LBT pass) and thus the gNB 704 may transmit RA 714, however the WTRU 706 will not receive the RAR 714 because of the hidden node interference. In this case, based on the WTRU 706 detecting an LBT fail 710, the WTRU 706 may retransmit RACH Msg1 716 after a time delay but without power ramping.

Although the features and elements of the present invention are described in the preferred embodiments in particular combinations, each feature or element can be used alone without the other features and elements of the preferred embodiments or in various combinations with or without other features and elements of the present invention. Although the solutions described herein consider LTE, LTE-A, New Radio (NR) or 5G specific protocols, it is understood that the solutions described herein are not restricted to this scenario and are applicable to other wireless systems as well.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, WTRU, terminal, base station, RNC, or any host computer.

What is claimed is:

1. A wireless transmit/receive unit (WTRU), the WTRU comprising:
   a transceiver; and
   a processor;
   the transceiver configured to receive configuration information indicating physical random access channel (PRACH) resources;
   the processor and the transceiver configured to transmit a PRACH preamble using one of the indicated PRACH resources;
   the processor and the transceiver configured to perform a listen-before-talk (LBT) procedure for hidden node detection before monitoring for a random access response (RAR); and
   on a condition that the RAR is not received successfully, the transceiver is configured to:
      on a condition that a hidden node is detected, retransmit the PRACH preamble without power ramping;
      on a condition that a hidden node is not detected, retransmit the PRACH preamble with power ramping; and
   on a condition that the RAR is received successfully, the transceiver is configured to transmit a RACH message.

2. The WTRU of claim 1, wherein the processor is configured to determine whether to transmit the PRACH preamble using a first type of PRACH transmission or a second type of PRACH transmission based on at least one of a service type or a service requirement.

3. The WTRU of claim 2, wherein the service type or the service requirement include latency and performance.

4. The WTRU of claim 2, wherein the processor is configured to determine to use the first type of PRACH transmission for a low latency service type or service requirement and the processor is configured to determine to use the second type of PRACH transmission for an enhanced mobile broadband (eMBB) service type or service requirement.

5. The WTRU of claim 1, wherein the transceiver is configured to retransmit the PRACH preamble after a time delay.

6. The WTRU of claim 1, wherein the transceiver is further configured to receive a RACH message 2 (Msg2) from a base station.

7. The WTRU of claim 1, wherein the transceiver is configured to transmit the PRACH preamble in a RACH message 1 (Msg1).

8. The WTRU of claim 1 configured to perform RA in a New Radio unlicensed spectrum (NR-U) system.

9. The WTRU of claim 2, the processor and the transceiver configured to, on a condition that the second type of PRACH transmission is used:
randomly select a PRACH resource from the indicated PRACH resources,
perform a first LBT procedure on the randomly selected PRACH resource,
transmit a PRACH preamble in the randomly selected PRACH resource; and
perform a second LBT procedure for hidden node detection before monitoring for a random access response (RAR).

10. A method performed by a wireless transmit/receive unit (WTRU), the method comprising:
receiving configuration information indicating physical random access channel (PRACH) resources;
transmitting a PRACH preamble using one of the indicated PRACH resources;
performing a listen-before-talk (LBT) procedure for hidden node detection before monitoring for a random access response (RAR); and
on a condition that the RAR is not received successfully:
retransmitting, on a condition that a hidden node is detected, the PRACH preamble without power ramping; and
retransmit, on a condition that a hidden node is not detected, the PRACH preamble with power ramping.

11. The method of claim 10, further comprising determining whether to transmit the PRACH preamble using a first type of PRACH transmission or a second type of PRACH transmission based on at least one of a service type or a service requirement.

12. The method of claim 11, wherein the service type or the service requirement include latency and performance.

13. The method of claim 11, wherein the first type of PRACH transmission is used for a low latency service type or service requirement and the second type of PRACH transmission is used for an enhanced mobile broadband (eMBB) service type or service requirement.

14. The method of claim 10, further comprising:
on a condition that the RAR is received successfully, transmitting a RACH message.

15. The method of claim 14, wherein the PRACH preamble is retransmitted after a time delay.

16. The method of claim 14, further comprising:
receiving a RACH message 2 (Msg2) from a base station.

17. The method of claim 10, wherein the PRACH preamble is transmitted in a RACH message 1 (Msg1).

18. The method of claim 10 performed in a New Radio unlicensed spectrum (NR-U) system.

19. The method of claim 11, comprising: on a condition that the second type of PRACH transmission is used:
randomly selecting a PRACH resource from the indicated PRACH resources; performing a first LBT procedure on the randomly selected PRACH resource;
transmitting a PRACH preamble in the randomly selected PRACH resource; and
performing a second LBT procedure for hidden node detection before monitoring for a random access response (RAR).

* * * * *